(12) United States Patent
Zhu et al.

(10) Patent No.: US 11,542,015 B2
(45) Date of Patent: Jan. 3, 2023

(54) AIRCRAFT ENVIRONMENTAL CONTROL SYSTEM

(71) Applicant: United Technologies Research Centre Ireland, Limited, Cork (IE)

(72) Inventors: Yonghua Zhu, Cork (IE); Catherine Thibaud, South Windsor, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 355 days.

(21) Appl. No.: 16/707,848

(22) Filed: Dec. 9, 2019

(65) Prior Publication Data
US 2020/0385128 A1 Dec. 10, 2020

(30) Foreign Application Priority Data
Jun. 7, 2019 (EP) .................................. 19179197

(51) Int. Cl.
*B64D 13/06* (2006.01)

(52) U.S. Cl.
CPC ........ B64D 13/06 (2013.01); *B64D 2013/064* (2013.01); *B64D 2013/0618* (2013.01)

(58) Field of Classification Search
CPC ........ B64D 13/08; B64D 13/06; B64D 13/02; B64D 2013/0618; B64D 2013/0688; B64D 2013/0611; B64D 2013/064; B64D 2013/0644; B64D 2013/0655; B64D 2221/00; B64D 2013/0625; B64D 13/006; B64D 33/02; B64D 33/04; F02C 6/08
See application file for complete search history.

(56) References Cited

U.S. PATENT DOCUMENTS

| 3,752,422 A | * | 8/1973 | Runnels ................. B64D 13/00 244/53 B |
| 5,461,882 A | * | 10/1995 | Zywiak .................. B64D 13/06 62/401 |
| 8,612,063 B2 | | 12/2013 | Lau et al. |

(Continued)

FOREIGN PATENT DOCUMENTS

| EP | 3144224 A1 | 3/2017 |
| EP | 3354573 A1 | 8/2018 |
| EP | 3480113 A1 | 5/2019 |

OTHER PUBLICATIONS

European Search Report for European Application No. 19179197.9, Application Filing Date Jun. 7, 2019; dated Nov. 21, 2019, 7 pages.

*Primary Examiner* — Gordon A Jones
(74) *Attorney, Agent, or Firm* — Cantor Colburn LLP

(57) ABSTRACT

An aircraft environmental control system comprising a fresh air input and a RAM air input, heat exchanger means for receiving fresh air from the fresh air input and RAM air from the RAM air input and using the RAM air to cool the fresh air, and means for providing the cooled fresh air to a cabin of the aircraft, the system further comprising means for feeding back exhaust air emitted from the interior of the aircraft to combine with the RAM air to further cool the fresh air, whereby the heat exchanger means comprises a main heat exchanger and a primary heat exchanger; wherein the main heat exchanger comprising a main heat exchanger cooling fluid inlet, a main heat exchanger cooling fluid outlet and a main heat exchanger bleed air inlet, the cooling fluid working to cool bleed air in the main heat exchanger.

6 Claims, 1 Drawing Sheet

(56) References Cited

U.S. PATENT DOCUMENTS

| | | |
|---|---|---|
| 10,017,032 B2 | 7/2018 | Behrens et al. |
| 10,144,517 B2 | 12/2018 | Bruno et al. |
| 10,232,948 B2 | 3/2019 | Bruno et al. |
| 10,239,624 B2 | 3/2019 | Behrens et al. |
| 10,457,399 B2 * | 10/2019 | Bammann ............... B64D 13/06 |
| 2012/0192578 A1 | 8/2012 | Finney |
| 2014/0345305 A1 | 11/2014 | Sieme et al. |
| 2017/0275004 A1 | 9/2017 | Bammann et al. |
| 2019/0225344 A1 * | 7/2019 | McCord ................ B64D 13/08 |
| 2021/0172338 A1 * | 6/2021 | Beers ..................... F04D 25/04 |

* cited by examiner

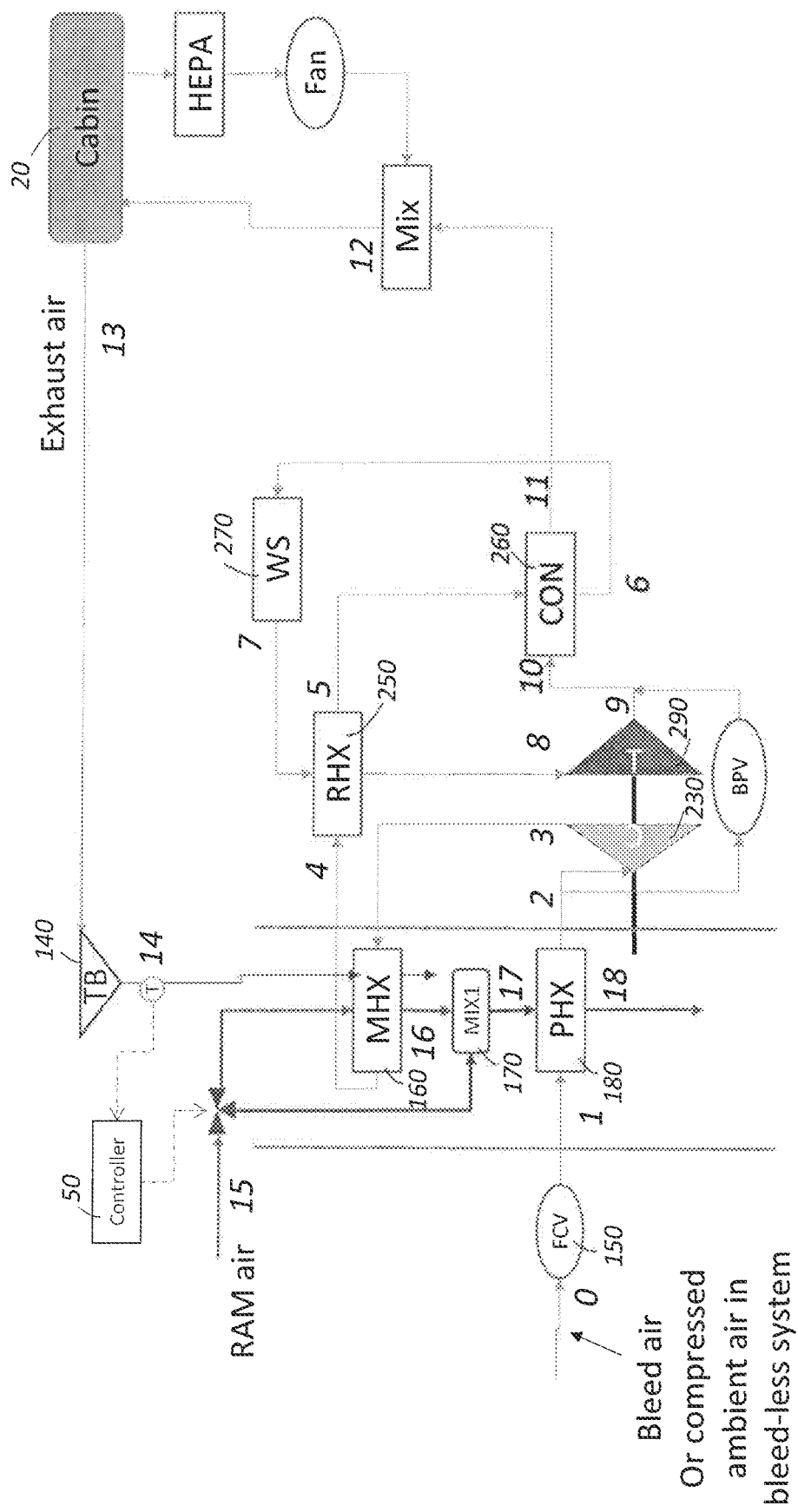

AIRCRAFT ENVIRONMENTAL CONTROL SYSTEM

CROSS-REFERENCE TO RELATED APPLICATIONS

This application claims the benefit of European Patent Application No. 19179197.9 filed Jun. 7, 2019, the disclosure of which is incorporated herein by reference in its entirety.

TECHNICAL FIELD

The present disclosure is concerned with environmental control systems for aircraft which provide pressurised and conditioned air to the aircraft cabin for the health and comfort of passengers and crew.

BACKGROUND

Environmental control systems (ECS) are provided in aircraft to provide pressurised and conditioned air to the inside of the aircraft cabin. Regulations provide for the minimum flow or conditioned air into the cabin per passenger. The Federal Aviation Authority (FAA) requires the fresh air flow rate to be at least 0.25 kg/min per passenger to dilute contaminants generated in the cabin, to provide thermal comfort and oxygen for occupants and to maintain cabin pressure. An ECS must be able to comply with such regulations while maximising efficiency in terms of power consumption but also minimizing overall size and weight of the ECS.

Generally, particularly in commercial aircraft, fresh air from the aircraft engine (bleed air), or compressed ambient air, is used to provide the ECS air flow. The incoming air is, however, at a relatively high temperature and pressure and so needs to be conditioned to the appropriate temperature and pressure before it is fed into the cabin. The way this is usually done is to use ambient air, brought into the system via a RAM air intake device, such as scoop. This air—so-called RAM air—is used in a system of heat exchangers to cool the bleed air or compressed ambient air. The RAM air is firstly used in a main heat exchanger (MHX) as a heat sink to cool the bleed air or compressed ambient air and then in a primary heat exchanger (PHX). By the time the RAM air has passed through the MHX, its temperature has already increased substantially. The RAM air is the sole heat sink for the bleed air and so its flow rate and temperature are the key factors that affect the efficiency and capacity of the heat exchangers and eventually the fuel consumption of the ECS. Introduction of RAM air creates drag on the aircraft and therefore introduces an energy or fuel penalty. In normal conditions up to two or three times as much RAM air as bleed air or compressed ambient air is required to condition the air provided to the cabin. The more RAM air required, the greater the energy/fuel penalty. RAM air penalty is one of the factors that determine ECS energy consumption. The ECS of an aircraft consumes the majority of the non-propulsive power.

There is great pressure on the aircraft industry to improve energy efficiency and to reduce emissions and there is, therefore, a need for a more energy efficient ECS.

SUMMARY

When an ECS operates, fresh and conditioned air is introduced into the cabin. An overboard valve is also used to exhaust the correct amount of air from the cabin and maintain the prescribed pressure. During flight, the exhaust air is usually at a higher temperature and pressure than ambient air but has already been cooled by the air conditioning system and is, therefore, cooler than, and at a lower pressure than incoming bleed air or compressed ambient air. The exhaust air is dumped overboard and, although, as described above, much energy has been involved in conditioning that air for use in the ECS, the air exhausted from the ECS is essentially wasted. The present inventors have considered how this exhaust air can be made use of in conditioning bleed air/compressed ambient air input into the ECS to avoid complete waste of the energy that went into conditioning the air from which the exhaust air derives.

According to the present disclosure, there is an aircraft environmental control system comprising a fresh air input and a RAM air input, heat exchanger means for receiving fresh air from the fresh air input and RAM air from the RAM air input and using the RAM air to cool the fresh air, and means for providing the cooled fresh air to interior cabin of the aircraft, the system further comprising means for feeding back exhaust air emitted from the cabin of the aircraft to combine with the RAM air to further cool the fresh air, whereby the heat exchanger means comprises a main heat exchanger and a primary heat exchanger; wherein the main heat exchanger comprising a main heat exchanger cooling fluid inlet, a main heat exchanger cooling fluid outlet and a main heat exchanger fresh air inlet, the cooling fluid working to cool fresh air in the main heat exchanger; wherein the primary heat exchanger comprises a primary heat exchanger cooling fluid inlet, a primary heat exchanger fresh air inlet and a conditioned air outlet; the system further comprising a controller to control, in a first condition, flow of the exhaust air to the main heat exchanger cooling fluid inlet and flow of the RAM air to mix with fluid from the main heat exchanger cooling fluid outlet to be provided to the primary heat exchanger cooling fluid inlet and, in a second condition, flow of the RAM air to the main heat exchanger cooling fluid inlet.

The fresh air is preferably either compressed ambient air fed in via a compressor or bleed air from an engine of the aircraft.

Preferably, the exhaust air is fed back via a turbine that expands the exhaust air.

Preferably, the controller controls the flow via a valve, e.g. a three-way valve to direct RAM air to either the main heat exchanger or the primary heat exchanger, preferably dependent on the temperature and/or pressure of the exhaust air.

Preferably, a mixer is provided between the main heat exchanger cooling fluid outlet and the primary heat exchanger cooling fluid inlet to mix RAM air with air exiting the main heat exchanger and entering the primary heat exchanger.

The disclosure also provides a method of conditioning aircraft bleed air for cabin air comprising controlling the flow of RAM air and exhaust air, from the cabin, according to the temperature and/or pressure of the exhaust air, in a heat exchange system, to condition bleed air.

BRIEF DESCRIPTION OF THE FIGURE

FIG. 1 is a schematic view of an environmental control system according to a first embodiment in accordance with the disclosure.

DETAILED DESCRIPTION

The system of the present disclosure makes use of the cabin exhaust air, which has already been cooled and conditioned by the ECS, though it has become warmer in the cabin, to condition incoming bleed air or compressed ambient air to make use of the energy invested in creating the exhaust air and to reduce the amount of RAM air and, thus, energy, for conditioning the bleed air or compressed ambient air for cabin air conditioning.

FIG. 1 shows one embodiment of an ECS according to the disclosure. It is envisaged that other configurations could fall within the scope of the invention as described by the claims.

First, the parts of the ECS also known from conventional ECS systems will be described.

The ECS is provided to provide conditioned air to the aircraft cabin 20. The source air is bleed air 0 from the aircraft engine. In an alternative embodiment, the source air can be compressed ambient air, via a compressor, rather that air from the engine. This is provided to the ECS via a flight control valve 1 which changes position depending on flight conditions of the aircraft. As the bleed air or compressed ambient air temperature and pressure are too high for the conditioned air, cool RAM air 15 is provided into the ECS. The RAM air is used as the cooling or working fluid in a heat exchange system to which the bleed air or compressed ambient air is provided as the fluid to be cooled. The heat exchange system can be any available heat exchanger known in the art. In the examples shown, the heat exchange system comprises a main heat exchanger MHX 160 followed by a primary heat exchanger PHX 180. The RAM air acts as a heat sink, in the heat exchange system, thus cooling and reducing the pressure of the bleed air or compressed ambient air. After the primary heat exchanger, the bleed air or compressed ambient air is divided into two streams: the main one goes into the compressor 230 and the second one bypasses a portion of the system and is integrated again at the turbine, 290, outlet. After the compression phase, the main stream passes through the main heat exchanger and then passes through the hot side of the reheater, RHX, 250 and condenser, CON, 260 where condensates form. After entering the water separator, WS, 270 the collected condensate is sprayed into the RAM channel to enhance heat transfer effect. The export dry air undergoes temperature and pressure reductions in the turbine, T, 290 after passing through the cold side of RHX. The conditioned bleed air is provided via the cold side of the condenser 260 to the cabin 20 (via connections 11/12) to set the cabin air to the desired temperature and pressure. The cabin air needs to be maintained at the required temperature and pressure, and as the air becomes warm it is fed out of the cabin as exhaust air 13 and is replaced by new conditioned air. As mentioned above, this exhaust air is then usually just emitted to the outside environment as waste.

The present systems make use of the exhaust air and the fact that there is usually a large pressure difference between cabin and ambient air in a cruise condition, and uses the exhaust air to cool the bleed air or compressed ambient air thus reducing the amount of RAM air needed to cool the bleed air.

The exhaust air is introduced into the ECS to mainly cool the bleed air or compressed ambient air in the main heat exchanger during flight phases. Then the RAM air could be used to mainly cool the bleed air or compressed ambient air in the primary heat exchanger.

In the embodiment of FIG. 1, exhaust air 13 is provided to a turbine 140. Energy from the warmed exhaust air drives the turbine 140, which expands (and thus reduces the pressure and temperature of) the exhaust air.

In more detail, exhaust air from the cabin, which is conditioned air from the ECS that has become warm, is fed into the turbine 140. The heat energy from the warmed air, if sufficiently low compared to ambient, will drive the turbine 140. This works if there is sufficient pressure differential between cabin pressure and ambient pressure, otherwise, as mentioned below, the exhaust air will not be able to drive the turbine 140 and the turbine is then OFF.

In conditions where the turbine 140 is driven by the exhaust air (as will usually be the case during flight), cooled air from the turbine 140 is provided to the main heat exchanger 160. In this case, controller 50 switches a valve (here a three-way valve 150). The valve 150 is positioned to direct the flow of RAM air into the system.

When air from the turbine 140 is provided to the main heat exchanger 160, the controller 50 switches the valve 150 such that no RAM air is provided to the main heat exchanger 160. Thus, the cooling fluid in the main heat exchanger 160 is the expanded exhaust air from the turbine 140. This cools bleed air or compressed ambient air passing through the main heat exchanger. Under this condition, the exhaust air is then dumped overboard.

Instead of being directed to the main heat exchanger, the RAM air is directed, via the valve 150, to mixer 170 where it is mixed with cooling fluid from the main heat exchanger 160. The mix is provided to the primary heat exchanger 180 where it is used as the cooling fluid to cool bleed air or compressed ambient air also provided to the primary heat exchanger. The output conditioned bleed air/compressed ambient air is fed to the cabin as described above.

In this embodiment, usually, during flight, where the temperature of exhaust air leaving the turbine 140 is much lower than that of the RAM air and there is a large pressure difference between cabin pressure and ambient pressure, all of the RAM air is provided to the mixer and cools the bleed/compressed ambient air in the primary heat exchanger as compared to known systems in which RAM air is provided first to the main heat exchanger, where its temperature will increase, and then to the primary heat exchanger. Only in the case (such as in a ground condition) where the cabin pressure and ambient pressure are almost the same, so the turbine is not operated, and so no air is provided from the turbine to the main heat exchanger, will the RAM air be directed in the conventional way, via the valve 150 under control of the controller 50, to the main heat exchanger and then to the primary heat exchanger. The ratio of RAM air going to the main heat exchanger and RAM air going to the mixer/primary heat exchanger is determined by the controller.

The expanded exhaust air thus acts as a supporting heat sink for the ECS so as to reduce the amount of RAM air that has to be introduced.

Typically, during flight, there will be a large pressure difference between the cabin pressure and ambient pressure, which will drive the turbine 140 to provide sufficient cooled, expanded exhaust air to cool the bleed/compressed ambient air in the main heat exchanger, so that only a small amount of RAM air is needed to cool the bleed/compressed ambient air in the primary heat exchanger. In such conditions, also, there is a lesser temperature difference between the bleed/compressed ambient air and the RAM air in the primary heat exchanger, and so the RAM air requirement is less for the same cooling capacity.

The use of exhaust air in cooling the bleed/compressed ambient air results in a significant demand for RAM air in the ECS thus resulting in energy savings as well as allowing smaller, lighter components. The RAM air flow rate requirement is reduced for the majority of the flight so long as conditions allow the exhaust gas to be expanded at the turbine. This also, in turn, allows the drag due to the RAM air turbine to be decreased and, thus, allows the energy/fuel penalty to be decreased.

What is claimed is:

1. An aircraft environmental control system comprising:
a fresh air input and a RAM air input;
heat exchanger means for receiving fresh air from the fresh air input and RAM air from the RAM air input and using the RAM air to cool the fresh air, and a connection that provides the cooled fresh air to an interior of the aircraft; and
a turbine that feeds back exhaust air emitted from the interior of the aircraft to combine with the RAM air to further cool the fresh air,
wherein the heat exchanger means comprises a main heat exchanger and a primary heat exchanger;
wherein the main heat exchanger comprises:
a main heat exchanger cooling fluid inlet;
a main heat exchanger cooling fluid outlet; and
a main heat exchanger fresh air inlet, the cooling fluid working to cool fresh air in the main heat exchanger;
wherein the primary heat exchanger comprises:
a primary heat exchanger cooling fluid inlet;
a primary heat exchanger fresh air inlet; and
a conditioned air outlet;
the system further comprising a controller to control, in a first condition, flow of the exhaust air to the main heat exchanger cooling fluid inlet and flow of the RAM air to mix with fluid from the main heat exchanger cooling fluid outlet to be provided to the primary heat exchanger cooling fluid inlet and, in a second condition, flow of the RAM air to the main heat exchanger cooling fluid inlet;
wherein a mixer is provided between the main heat exchanger cooling fluid outlet and the primary heat exchanger cooling fluid inlet to mix RAM air with air exiting the main heat exchanger and entering the primary heat exchanger.

2. The system of claim 1, wherein the turbine expands the exhaust air.

3. The system of claim 1, wherein the controller controls control flow via a valve-to direct RAM air to either the main heat exchanger or the primary heat exchanger.

4. The system of claim 1, wherein the fresh air is compressed ambient air.

5. The system of claim 3, wherein the valve is three way valve.

6. The system of claim 3, wherein the controller controls flow via the valve to direct RAM air to either the main heat exchanger or the primary heat exchanger, dependent on the temperature or pressure of the exhaust air.

* * * * *